No. 894,651. PATENTED JULY 28, 1908.
C. E. HOLMES.
METER.
APPLICATION FILED MAY 6, 1905.
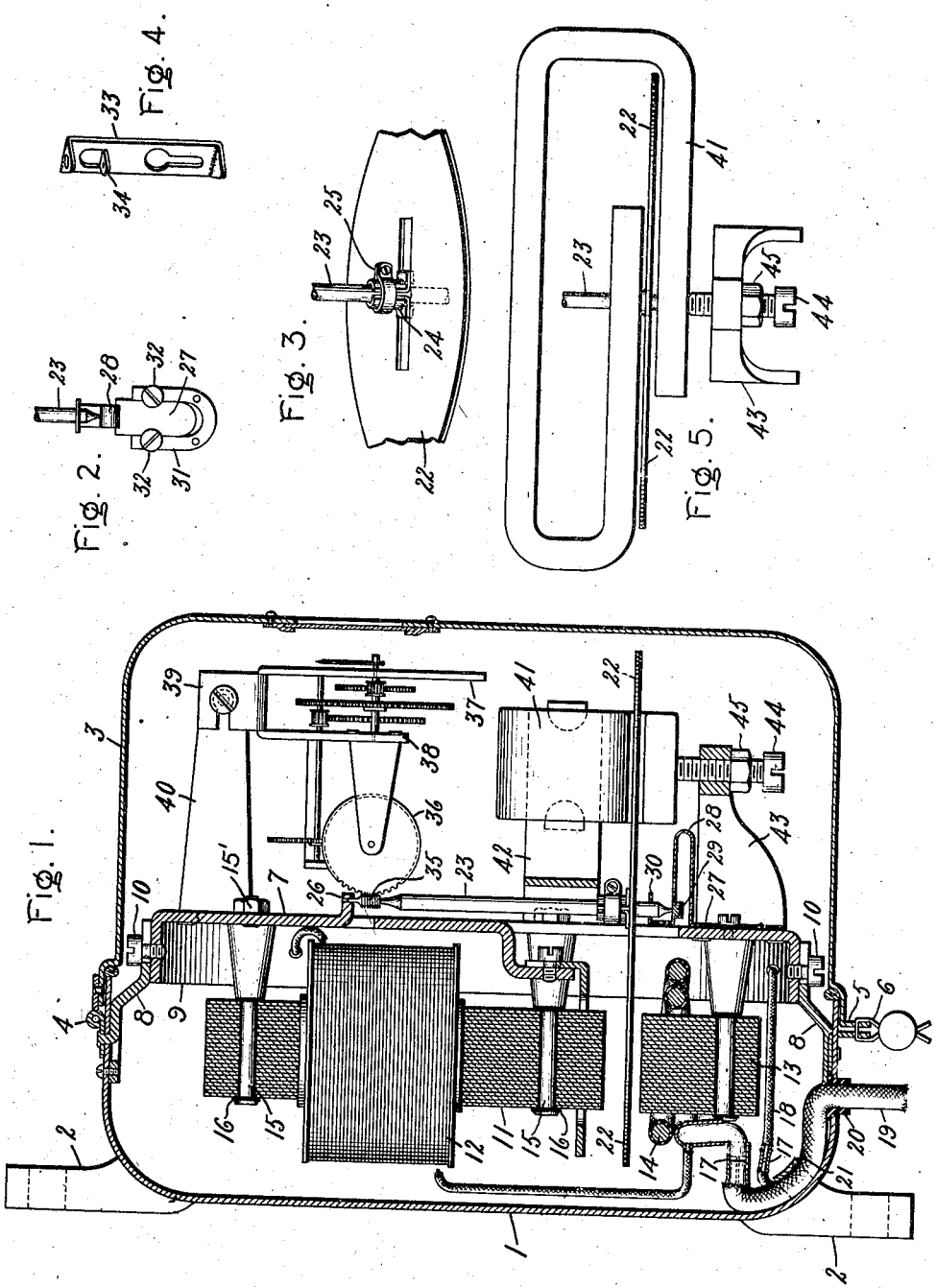
Witnesses
George W. Tilden.
Helen Alford
Inventor
Charles E. Holmes,
by Albert G. Davis
Att'y.

UNITED STATES PATENT OFFICE.

CHARLES E. HOLMES, OF LYNN, MASSACHUSETTS, ASSIGNOR TO GENERAL ELECTRIC COMPANY, A CORPORATION OF NEW YORK.

METER.

No. 894,651.    Specification of Letters Patent.    Patented July 28, 1908.

Application filed May 6, 1905. Serial No. 259,092.

*To all whom it may concern:*

Be it known that I, CHARLES E. HOLMES, a citizen of the United States, residing at Lynn, county of Essex, State of Massachusetts, have invented certain new and useful Improvements in Meters, of which the following is a specification.

This invention relates to electric meters and more particularly to integrating electric meters of the motor type.

The object of the invention is to effect certain improvements in the design of such meters whereby the construction is simplified and the cost of production reduced. I accomplish this by arranging the parts so that the meter is of small size and light weight, by making many of the parts of sheet-metal punchings which are inexpensive and which may be bent so as to take the place of two or more parts formerly used, by eliminating binding posts and by providing a new and simple means for adjusting the retardation of the moving element.

The features of my invention are of special utility in integrating induction motor meters but some of them are also applicable to direct-current meters and to electric measuring instruments of all classes.

The novel features of my invention will be definitely indicated in the claims appended hereto.

The details of construction of my improved meter will be better understood by reference to the following description taken in connection with the accompanying drawings, in which—

Figure 1 is a sectional elevation of the meter; Fig. 2 is an elevation of the lower bearing; Fig. 3 is a perspective view of the disk armature; Fig. 4 is a perspective view of a modified form of lower bearing; and Fig. 5 is a front view of the damping device.

In its general construction and in its method of operation the meter shown herein is similar to that shown and described in my application, Serial Number 233,942, filed November 23, 1904.

Referring to the drawings, the meter is inclosed within a drawn metal casing preferably of circular form and consisting of a back 1 having feet 2 for securing it to a support and a cover 3. The back and cover are hinged together at the top, as indicated at 4, and provided with ears 5 at the bottom perforated to receive a sealing wire 6. All of the operating mechanism of the meter is supported on a central diaphragm or supporting member 7 and this supporting member is mounted within the casing in a manner permitting it to be quickly and readily taken out in order that all of the parts may be perfectly accessible for inspection and repair without even removing the meter from the wall or other support. For this purpose a plurality of supporting fingers 8 are secured to the back 1 and extend forward beyond the edge of the cover and the ends of these fingers are provided with slots open at the front as indicated in Fig. 1. The circular supporting member 7 is provided with an inturned flange 9 having threaded openings therein in alinement with the slots in the fingers 8 and screws 10 extend through the slots and into these threaded openings. Thus by merely loosening the screws 10 the supporting member 7 can be drawn forward from between the supporting fingers 8 and as the leads to the coils of the meter are provided with detachable couplings, as will hereinafter more fully appear, this permits of the entire removal of the operating mechanism of the meter from the casing.

As is usual in induction meters, the motor mechanism consists of bundles of sheet-metal laminations having shunt and series coils wound thereon in which magnetic fluxes are developed which act on a pivotally mounted metallic disk to cause rotation thereof in a manner well understood by those skilled in the art. The specific motor mechanism shown herein is similar to that described in my pending application above referred to. One bundle of laminations 11 is preferably U-shaped and has potential coils 12 on the legs thereof connected in series. Another bundle of laminations 13 is arranged directly below the bundle 11 and has a series coil 14 wound thereon. In securing the laminated structures in position I employ bolts each of which is arranged to hold the laminations tightly together and to hold the bundle to the back of the supporting member so that even though the bolt becomes loose upon the supporting member the laminations will be held tightly so that rattling of the parts due to the alternations of the current in the coils is avoided. These bolts 15 are held by nuts 15' to the member 7 at one end and the other end is reduced forming a shoulder in the middle of the bolt and a stem which extends through openings in the laminations. This shoulder and the stem are insulated as indicated at 16 and the end of the stem is turned over so as to press the laminæ together between it and the insulated shoulder. The laminæ are thus held tightly together and secured to the back of the supporting member independently by the same bolts.

The ends of the series coil 14 are bent at right angles, as shown in Fig. 1, the insulation removed therefrom and one end of a short metallic tube 17 split at the other end is soldered thereto. The end of one of the potential coils 12 is electrically connected to the series coil 14 and the end of the other coil is carried through openings in the flange 9 of the supporting member 7 and brought down adjacent to the ends of the series coil 14, as indicated at 18. The insulation is removed from the end of this lead 18 and a connector 17 similar to those on the ends of the series coil 14 is soldered thereto. The three leads 19 to the meter enter through openings in the back 1 insulated by bushings 20, are secured in position within the meter by binding strips 21 and have their ends bared and bent up in position to be engaged by the connectors 17 so as to make a good frictional contact therewith. Thus when the screws 10 are loosened and the supporting member 7 and parts carried thereby drawn forward, these detachable couplings permit the leads to the coils 12 and 14 to be detached from the wires 19 entering the meter so that all of the operating parts of the meter may be readily withdrawn from the casing for purposes of inspection or repair. When these purposes have been accomplished the member 7 can be quickly slid in between the fingers 8 and the couplings 17 pushed over the ends of the leads 19.

The armature 22 consists of a disk of aluminum or copper secured to a shaft 23 pivotally mounted in front of the member 7. This disk is a sheet-metal punching and in order to simplify the construction the disk is cut so as to provide integral arms 24 which are bent back upon the disk and upwards around shaft 23, as shown in Figs. 1 and 3. A clamping ring 25 is then tightened up upon the arms 24 to hold them tightly against the shaft. The bearing for the upper end of shaft 23 consists of an opening in a projection 26 integral with the supporting member 7 and formed by punching out the supporting member and bending the portion 26 at right angles thereto. The lower bearing for shaft 23 preferably consists of a single piece of sheet-metal carrying a jewel and bent so as to form a yielding support. As shown in Figs. 1 and 2, the lower bearing consists of a long thin strip of sheet-metal 27 bent to form a loop 28 between its ends and having a jewel 29 cemented in a depression therein; the upper end of the strip 27 is preferably bent at right angles as indicated at 30 and provided with an opening in the bent portion through which the end of shaft 23 extends so that lateral displacement of the end of the shaft is prevented. The bearing 27 is adjustable vertically between the legs of a flat U-shaped piece 31 secured to the supporting member 7, screws 32 being arranged with their heads overhanging the strip 27 so that when they are tightened up they hold the bearing in any adjusted position. In Fig. 4 I have shown a modified form of lower bearing in which the jewel is rigidly supported. This bearing also consists of a sheet-metal strip 33 and has an integral portion 34 punched out and bent at right angles and a jewel cemented in a depression in this bent-out portion. The ends of strip 33 are bent at right angles, the upper one having an opening through which the end of the shaft extends and the lower one forming a finger-hold to facilitate the vertical adjustment of the bearing. A key-hole slot is cut in the strip 33 to permit this adjustment and the ready removal of the bearing when the supporting screw which extends through the slot is loosened.

Near the upper end of shaft 23 is a worm 35 meshing with a worm-wheel 36 which drives the wheel train forming the dial of the meter. I simplify the construction of the dial by making the front-plate 37, the back-plate 38 and the projecting portions 39 by which the dial is secured to arms 40 fastened to the front of the supporting member 7, from a single sheet-metal punching which is bent as shown in Fig. 1. The front and back plates 37 and 38 may be sprung apart far enough to permit of inserting the shafts of the wheel train in their bearings and the ears 39 are provided with slots to receive the screws by which the dial is detachably secured to its supports.

The means for retarding the rotation of the moving element consists of a permanent magnet 41 bent as shown in Fig. 5, with one pole above and one below the disk 22. The magnet is supported on arms 42 which are riveted to the front of the supporting member 7. I have found that the permanent magnets commonly employed in electric measuring instruments possess a sufficient amount of elasticity to permit of forcing the integral poles thereof toward or away from each other and thus varying the air-gap between them enough to give the required adjustment of the damping effect. I therefore provide means for forcing one of the integral poles of magnet 41 toward the other and in this way varying the magnetic flux which cuts the disk 22. This preferably consists of a bracket 43 secured to the supporting member 7 and having a screw 44 in its outer end which may be turned so as to bear against one pole of magnet 41 and force it upward closer to disk 22 and the other pole of the magnet. When the desired position is reached screw 44 may be secured in position by a lock-nut 45. In this way the air-gap between the poles of the magnet and hence the magnetic flux cutting disk 22, may be adjusted as desired.

What I claim as new and desire to secure by Letters Patent of the United States is,—

1. An electric meter comprising a casing, a supporting member detachably mounted therein, electric motor mechanism having its actuating coils secured to one side of the supporting member, a permanent magnet for retarding the rotation of the moving element of the motor secured to the other side thereof, leads entering the meter casing, and a coupling for releasably connecting said leads to the coil terminals adapted to produce automatically an engagement of said leads and coil terminals when said supporting member is moved into place.

2. In an electric meter, a casing, a supporting member, operating mechanism including a coil carried thereby, screws for detachably securing the supporting member to the casing said screws entering threaded openings in one of said parts and slots open at one end in the other, said slots forming a guide for the removal and replacing of said supporting member, a lead entering the casing, and a coupling for releasably connecting said lead and a terminal of said coil adapted to produce automatically an engagement of said lead and terminal when said supporting member is moved into place.

3. An electric meter comprising a rotating element and means for registering the rotations of said element comprising a dial having front and back plates and ears for securing it to a support and a dial train mounted between the two plates and geared to said rotating element, said front and back plates and supporting ears being formed integral from a single sheet-metal punching.

4. An electric meter comprising a shaft, bearings therefor, an electric motor whose armature is carried by the shaft, means for retarding the rotation of the shaft comprising a permanent magnet mounted in proximity to a member of conducting material carried by the shaft, and means for registering the rotations of the shaft comprising a dial having front and back plates and ears for securing it to a support and a dial train mounted between the two plates, said front and back plates and supporting ears being formed integral from a single sheet-metal punching.

5. In an electric meter, a supporting member carrying the stationary motor elements of the meter, a bearing for the rotating motor element comprising a punching having an integral portion bent at right angles to the main portion, means for adjustably clamping said main portion to said supporting member, and a jewel supported rigidly on said bent portion.

6. In an electric measuring instrument, a lower bearing for a vertical shaft consisting of a sheet-metal strip, and a jewel supported thereon, said strip being bent so as to yieldingly support the jewel.

7. In an electric measuring instrument, a support, a vertical shaft, and a lower bearing for the shaft consisting of a sheet-metal strip attached to said support, and a jewel mounted thereon, said strip being bent to form a loop between the jewel and the point of attachment to the support whereby the jewel is yieldingly supported.

8. In an electric measuring instrument, a lower bearing for a vertical shaft consisting of a sheet-metal strip, a jewel carried thereby, a support, and screws entering the support on opposite sides of the strip the heads of which overhang the strip.

9. In an electric measuring instrument, a rotatable shaft, a sheet-metal plate of conducting material carried thereby having integral arms formed from portions of the plate bent along the shaft, and a clamping ring about said arms pressing them against the shaft.

10. In an electric measuring instrument, a moving element and means for damping the movements thereof comprising a plate of conducting material, a permanent magnet coöperating therewith, and means for varying the air-gap between the integral poles of said magnet.

11. In an electric measuring instrument, a moving element and means for damping the movements thereof comprising a plate of conducting material, a permanent magnet coöperating therewith, a frame having a threaded opening therein, and a screw axially adjustable in said opening the end of which bears against one of the integral poles of said magnet.

12. In an electric measuring instrument, a moving element and means for damping the movements thereof comprising a plate of conducting material, a permanent magnet coöperating therewith, and means for springing the magnet poles to vary the gap.

In witness whereof, I have hereunto set my hand this fourth day of May, 1905.

CHARLES E. HOLMES.

Witnesses:
   JOHN A. MCMANUS, Jr.,
   HENRY O. WESTENDARP.